United States Patent [19]
Webb

[11] 4,021,344
[45] May 3, 1977

[54] OIL PICK UP DEVICE

[75] Inventor: Michael Guthrie Webb, Wootton Bridge, England

[73] Assignee: The British Petroleum Company Limited, London, England

[22] Filed: June 11, 1975

[21] Appl. No.: 585,886

Related U.S. Application Data

[63] Continuation of Ser. No. 519,842, Oct. 31, 1974, abandoned, which is a continuation of Ser. No. 342,452, March 19, 1973, abandoned.

[30] Foreign Application Priority Data

Mar. 22, 1972 United Kingdom ............ 13402/72
Apr. 27, 1972 United Kingdom ............ 19555/72

[52] U.S. Cl. .................... 210/122; 210/242 S; 210/DIG. 25; 210/DIG. 26
[51] Int. Cl.[2] .................................... E02B 15/04
[58] Field of Search .................. 73/309, 451, 453; 210/104, 119, 121, 122, 242 AS, 242 S, DIG. 21 M, DIG. 25, DIG. 26

[56] References Cited

UNITED STATES PATENTS

| | | | |
|---|---|---|---|
| 3,358,838 | 12/1967 | Kosar et al. | 210/242 |
| 3,722,689 | 3/1973 | Markel et al. | 210/242 S |
| 3,727,765 | 4/1973 | Henning et al. | 210/242 |

FOREIGN PATENTS OR APPLICATIONS 1,334,927  10/1973  United Kingdom

Primary Examiner—Charles N. Hart
Assistant Examiner—Ivars Cintins
Attorney, Agent, or Firm—Morgan, Finnegan, Pine, Foley & Lee

[57] ABSTRACT

An oil pick up device for removing oil off the surface of water consists of a series of vertical plates driven from a central drive member. The plates pass through the oil/water surface and oil is picked up. Scrapers remove the oil and lead it away. There is also incorporated a pneumatic device for maintaining the pick-up device at the right level in the water.

13 Claims, 3 Drawing Figures

OIL PICK UP DEVICE

This is a continuation of application Ser. No. 519,842 filed Oct. 31, 1974, which is a continuation of application Ser. No. 342,452, filed Mar. 19, 1973, both now abandoned.

This invention relates to a device for picking up oil on the surface of water.

When crude petroleum or refined petroleum products are transported, there is always a risk of spillage taking place. If this happens at sea or on inland waterways, the water can be polluted by oil floating on its surface.

We have now invented a device for picking up the oil from the water surface.

According to the invention there is provided a device for removing oil floating on the surface of water hereinafter referred to as a pick-up device which device comprises a plurality of discs rotatably mounted on bearings, which bearings are positioned substantially along different radii of a circle, hereinafter referred to as the median circle, there being means to rotate a disc about each bearing, said device being supported on floats whereby when the device is placed on water the device floats with the discs partly immersed in the water, there being scrapers attached to each disc so that, on rotation of the discs the scrapers remove any liquid adhering to the disc.

Preferably the planes of rotation of the discs pass through radii of the median circle, and the planes of rotation of the discs meet in a line passing through the centre of the median circle.

Preferably all the bearings lie on the circumference of a circle coaxial with the median circle, more preferably this circle is concentric with the median circle.

There can also be in addition other discs mounted on bearings which do not lie on radii of the median circle, which other discs can be rotated by the same of different rotation means.

The means to rotate the discs preferably consist of teeth cut in the circumference of the discs which teeth engage with a worm ring which is mounted with its centre coaxial with the centre of the median circle. When the worm ring is rotated, the worm teeth engage with the teeth of each disc and thereby drive each disc round on its bearings. Preferably the worm ring is driven by having teeth cut on its inside, which teeth engage with a pinion which can be driven. The drive for the pinion can be any conventional drive mechanism e.g. a gasoline engine, a diesel engine or a hydraulic engine. When operating in oil spills which contain volatile material, preferably the drive mechanism is a diesel engine or a hydraulic engine in order to reduce the risk of fire.

The use of a hydraulic motor enables the power source to be remote from the pick-up device.

Preferably the discs have a smooth surface and are flat. The discs can be made of any sufficiently rigid material inert to water and sea-water. Preferred materials are plastics materials such as rigid polyvinyl chloride.

The scrapers preferably comprise oil resistant rubber or plastic strips fixed in contact with the discs. The scrapers are preferably positioned whereby when liquid is removed by the scrapers from the discs the liquid is fed into a channel and thereby led away.

The device is preferably constructed so that when the device floats on the surface of still water, the planes of rotation of the discs are preferably substantially perpendicular to the water surface.

The floats are preferably positioned so that there is one float mounted within the worm ring, and four floats equispaced around the circumference.

Preferably there are a multiplicity of discs e.g. greater than 16, preferably greater than 40 discs, in each device. The device preferably floats in water containing a layer of oil so that in operation the oil/water interface comes about a third of the way up each disc.

In operation, the pick-up device of the invention is placed on the water which is covered with a layer of oil, the worm ring is driven, and the discs rotate the oil/water interface and pick-up oil from the surface, the oil is scraped off by the scrapers and transferred to a suitable storing device.

When the device of the invention is operated, preferably the proportion of the discs which is below the surface of the water is maintained substantially constant. The oil/water interface preferably comes a third the way up the disc. However when the pick-up device is operated, oil is picked-up and lifted clear of the water. This oil causes an increase in weight of the pick-up device and can cause it to sink lower in the water, and the portion below the water surface is then below the preferred proportion.

Preferably the pick-up device of the present invention comprises (e.g. by having incorporated in it, or attached to it,) a means for maintaining substantially the same proportion of the discs below the oil/water interface during pick-up of any oil. Such a device is hereinafter referred to as a float level control.

A suitable float level control comprises a buoyancy tank adapted to be connected to water below the water surface when the device floats on a water surface, whereby the buoyancy tank is at least partly filled with water, there being a main air line connected to the buoyancy tank through a pneumatically operated valve, there being a secondary air line connected to the pneumatically operated valve, so that variations in pressure in the secondary air line can open and shut the pneumatically operated valve; connected to the secondary air line is a pressure controller, whereby when the device floats on water surface at the desired level, the pneumatically operated valve is closed, when the device sinks lower in the water the pressure controller causes air to flow in the secondary air line thus opening the pneumatically operated valve and causing air to pass along the main air line to the buoyancy tank to displace water in the buoyancy tank and thus increase the buoyancy of the device to cause it to float higher in the water.

The buoyancy tank preferably comprises a tank of cylindrical cross-section having at least one hole in its lower surface. The main air line is preferably connected to the top of the tank.

When the pick-up device is placed in the water, water is allowed to enter the buoyancy tank till the device floats at the required level above the water e.g. by leaving the pneumatically operated control valve off and no air supply in the main air line till the required amount of water is in the tank. The control valve is closed and the device floats at the required level on the water.

The pneumatically controlled valve can be any conventional valve in which increase in pressure above a certain predetermined level opens the valve and drop in pressure below the predetermined level closes the valve.

Preferably the pressure controller connected to the secondary air line comprises a tube having a float which can seal the end of the tube, when the pick-up device floats in the water the end of the tube dips under the water. The tube is connected to a sub-branch air line off the secondary air line, which sub-branch line also is connected to a pilot control valve. The pilot control valve is able to open and shut the flow of air in the secondary air line and thus open and shut the pneumatically controlled valve. In operation the air flows through the sub-branch line and bubbles out through bottom of the tube. The pilot control valve is shut and no air flows in the secondary air line. When the pick-up device is floating on water at the desired level, the depth of the open end of the tube below the water surface is adjusted so that the float just does not seal off the end of the tube. When the pick-up device sinks air cannot escape past the float and the pressure generated in the sub-branch opens the pilot control valve, and causes air to flow in the secondary air line, the pneumatically operated valve in the main air line then opens.

The air supply to the air lines can be through an air compressor. If a common source of air is to be used in both the main and secondary air lines there is preferably a choke in the secondary air line so that the pressure of air in this line is less than that in the main air line.

The invention also provides a method of removing oil from the surface of water which comprises placing the device of the invention on the surface of the water having the oil on it, rotating the discs, to remove oil from the surface of the water, scraping the oil off the discs with the scrapers and transferring it to a suitable storing device.

The invention will now be described with reference to the accompanying drawings in which.

Figure 1:
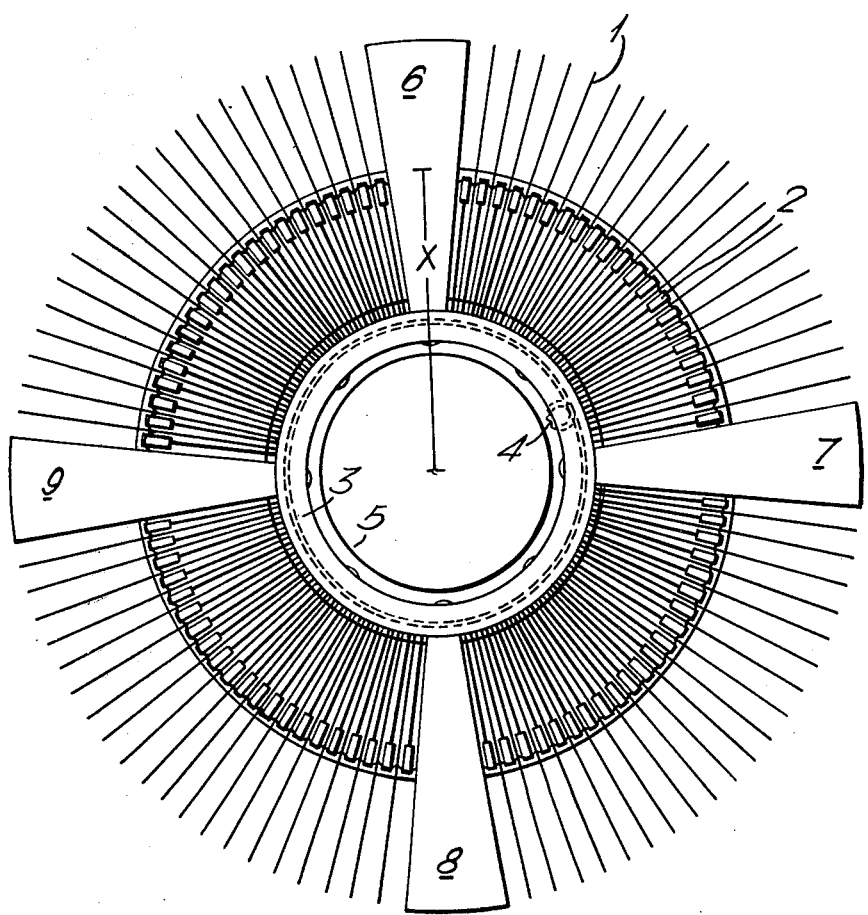
FIG. 1 is a plan view of the device.
Figure 2:
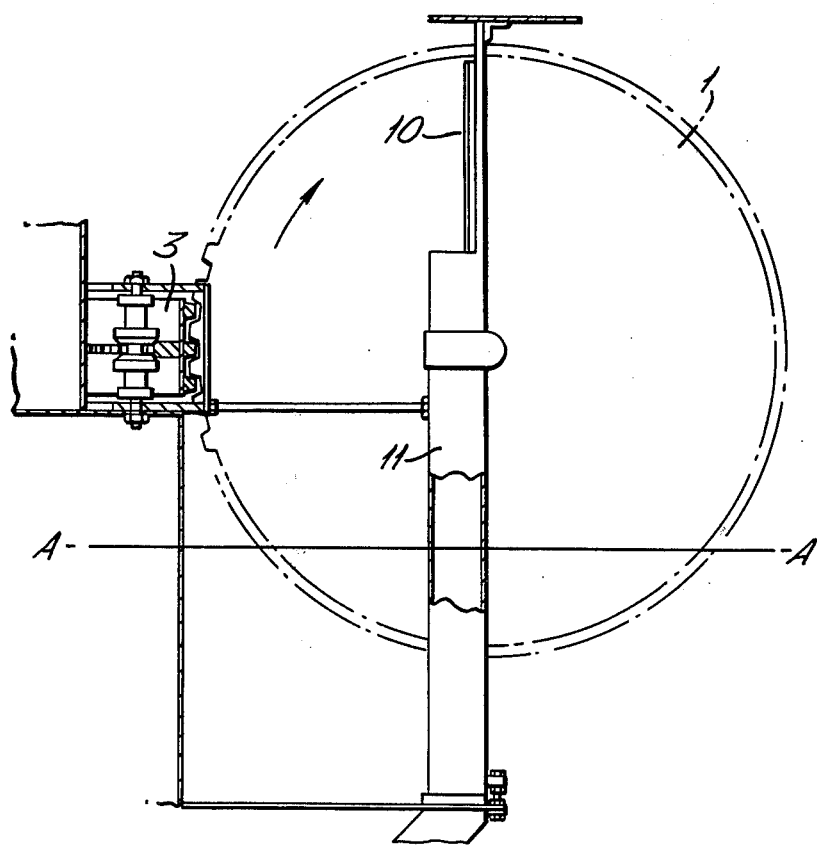
FIG. 2 is a side view of one of the discs.
Figure 3:
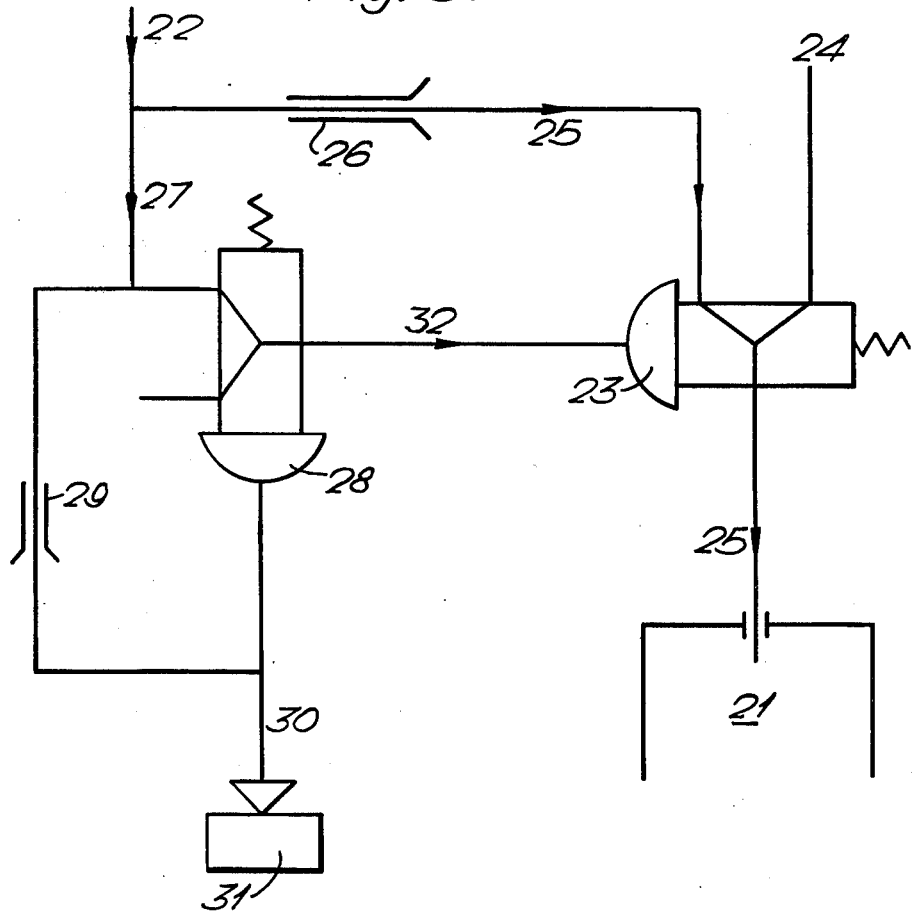
FIG. 3 is a schematic representation of a float level control.

The device consists of a plurality of discs 1 mounted on bearings 2, the bearings 2 all lying along radii of the same circle, (the median circle) as shown in the drawings, the bearings 2 all lie at the same distance X from the centre of the median circle. The worm ring 3, engages the teeth on each disc (shown in FIG. 2) so that when the worm ring rotates the disc rotates on the bearings 2. The worm ring 3 is driven by a pinion 4. Float member 5 is positioned in worm ring 3. (Not shown). Float members 6, 7, 8 and 9 are attached to float member 5 so that when the device is placed in water it floats with the disc 1 part above and part below the water, the disc 1 being substantially perpendicular to the water surface. Referring to FIG. 2, scraper blade 10, made of a plastics material, is in contact with the disc 1, so that when the disc 1 rotates in the direction of the arrow (FIG. 2) liquid adheres to the surface of disc 1 is scraped off by the scraper 10 and flows into channel 11, where it can be led away to a suitable storage or disposal means.

In operation the device is floated on the surface of the water covered in oil, with the water/oil interface coming along the line a A—A of FIG. 2, and the pinion 4 is rotated causing the worm ring 3 to go round and the disc thus to be rotated about the bearing 2. As the disc 1 passes through the oil/water interface a layer of oil adhering to the disc is scraped off by the scraper 10 and transferred to channel 11.

Thus the device enables oil to be removed from the surface of a liquid on which it is spilt.

A buoyancy tank 21 partly full of water has holes in its lower surface and is connected through an air line 22 to valve 23. Valve 23 has air line 24 venting to the atmosphere. Main air line 25 connects valve 23 to main air supply 22 through regulator 26.

Also connected to main air supply 22 is secondary air supply line 27. Secondary air supply line 27 passes via pilot control valve 28 to valve 23. A sub-branch 29 off secondary air line 27 passes via choke or flow regulator 29 to tube 30. Tube 30 is connected at one end to pilot control valve 28 and has float 31 at the other end, which float 31 can seal end of tube 30. The valve 23 can shut off or open tank 21 to an air flow from the main aim supply 22. The valve 23 is operated by flow of air through air line 32. The flow of air in air line 32 is controlled by pilot control valve 28 which is operated by air flow in tube 30.

In operation when the float level control is attached to the pick-up device and floats on water at or above the optimum level, the buoyancy tank 21 is partly full of water and connected to the water through holes in its lower surface. The tube 30 is open at one end and air passes out through this end, and valve 28 remains shut. During pick-up of oil the pick-up device increases in weight and the device sinks, when the pick-up device sinks below the optimum level the float 31 shuts off tube 30. The air passing along branch line 29 is caused thus to act on valve 28, which opens air line 32 leading to valve 23. Valve 23 operates to open main air line 25 which passes air into tank 21 increasing its buoyancy and preventing the device sinking further. If the device has sunk too far, air continues to pass into tank 21 till the buoyancy is such that the float 31 ceases to seal end of pipe 30 and valve 28 shuts and causes valve 23 to shut and cut off air supply to tank 21. The air passing into tank 21 forces out water in the tank through holes in its lower surface.

I claim:

1. A device for removing oil floating on the surface of water, which comprises: a plurality of discs; means rotatably mounting said discs substantially along different radii of a circle; scrapers contacting each disc so that on rotation of the discs the scrapers remove liquid adhering thereto, said device being supported on floats, whereby, when the device is placed on water the device floats with the discs partly immersed in the water; and means for rotating each disc, whereby oil is picked up along each of said different radii and said circular arrangement of discs causes the oil to be drawn inwardly of the device.

2. A device as claimed in claim 1 in which the planes of rotation of the discs meet in a line passing through the center of the said circle.

3. A device as claimed in claim 1 in which said discs are mounted on bearings and all the bearings lie on the circumference of a circle coaxial with said circle.

4. A device as claimed in claim 1 in which the means to rotate the discs consist of teeth cut in the circumference of the discs, which teeth engage with a worm ring which is mounted with its center coaxial with the center of the said circle.

5. A device as claimed in claim 4 in which the worm ring is driven by having teeth cut on its inside which teeth engage with a pinion, which pinion can be driven.

6. A device as claimed in claim 1 in which the discs have a smooth flat surface and are made of a plastics material.

7. A device as claimed in claim 1 in which the scrapers comprise rubber or plastics strips fixed in contact with the discs.

8. A device as claimed in claim 7 in which the scrapers are positioned whereby when liquid is removed by the scrapers from the discs the liquid is fed into a channel and thereby led away.

9. A device for removing oil floating on the surface of water which comprises: a plurality of discs rotably mounted on bearings, said bearings being positioned substantially along different radii of a circle; means to rotate each disc about its associated bearing for picking up oil along each of said different radii; said device being supported on floats, whereby when the device is placed on water the device floats with the discs partly immersed in the water; scrapers attached to each disc so that on rotation of the discs the scrapers remove any liquid adhering to the discs; a float level control for maintaining substantially the same proportion of the discs below the oil/water interface during pick up of any oil floating on a water surface.

10. A device for removing oil floating on the surface of water, which comprises: a plurality of discs; means rotatably mounting said discs substantially along different radii of a circle; scrapers contacting each disc so that on rotation of the discs the scrapers remove liquid adhering thereto, said device being supported on floats, whereby, when the device is placed on water the device floats with the discs partly immersed in the water; and means for rotating each disc, whereby oil is picked up along each of said different radii and said circular arrangement of discs causes the oil to be drawn inwardly of the device, said float level control comprising a buoyancy tank adapted to be in fluid communication with water below the water surface when the device floats on a water surface, whereby the buoyancy tank is at least partly filled with water; a main air line connected to the buoyancy tank through a pneumatically operated valve; a secondary air line connected to the pneumatically operted valve, so that variations in pressure in the secondary air line can open and shut the pneumatically operated valve a pressure controller connected to the secondary air line, whereby when the device floats on water surface at the desired level, the pneumatically operated valve is closed, when the device sinks lower in the water the pressure controller increases the pressure in the secondary air line thus opening the pneumatically operated valve and causing air to pass along the main air line to the buoyancy tank to displace water in the buoyancy tank and thus increase the buoyancy of the device.

11. A device as claimed in claim 10 in which the buoyancy tank comprises a tank of cylindrical cross-section having at least one hole in its lower surface.

12. A device as claimed in claim 11 in which the main air line is connected to the top of the buoyancy tank.

13. A device as claimed in claim 10 in which the said pressure controller connected to the secondary air line is an open tube, which, when the device floats on the water, dips under the water surface.

* * * * *